United States Patent
Yuksel et al.

(10) Patent No.: US 9,679,018 B1
(45) Date of Patent: Jun. 13, 2017

(54) DOCUMENT RANKING BASED ON ENTITY FREQUENCY

(71) Applicant: Google Inc., Mountain View, CA (US)

(72) Inventors: Baris Yuksel, New York, NY (US); Craig Nevill-Manning, New York, NY (US); Daniel J. Yehuda, New York, NY (US)

(73) Assignee: Google Inc., Mountain View, CA (US)

( * ) Notice: Subject to any disclaimer, the term of this patent is extended or adjusted under 35 U.S.C. 154(b) by 408 days.

(21) Appl. No.: 14/183,936

(22) Filed: Feb. 19, 2014

Related U.S. Application Data

(60) Provisional application No. 61/904,179, filed on Nov. 14, 2013.

(51) Int. Cl.
*G06F 17/30* (2006.01)
(52) U.S. Cl.
CPC .................. *G06F 17/3053* (2013.01)
(58) Field of Classification Search
CPC ........... G06F 17/30867; G06F 17/3053; G06F 17/30699
See application file for complete search history.

(56) References Cited

U.S. PATENT DOCUMENTS

| | | | |
|---|---|---|---|
| 5,907,836 A * | 5/1999 | Sumita ................ | G06F 17/3061 707/754 |
| 5,987,460 A * | 11/1999 | Niwa ................ | G06F 17/30696 |
| 6,144,964 A * | 11/2000 | Breese .............. | G06F 17/30867 707/758 |
| 6,886,010 B2 * | 4/2005 | Kostoff ............. | G06F 17/30705 |
| 8,108,376 B2 | 1/2012 | Okamoto et al. | |
| 8,122,047 B2 | 2/2012 | Kanigsberg et al. | |
| 8,229,873 B1 | 7/2012 | Dolan et al. | |
| 8,375,073 B1 | 2/2013 | Jain | |
| 8,429,106 B2 | 4/2013 | Downs et al. | |
| 8,856,145 B2 * | 10/2014 | Parikh .............. | G06F 17/30613 707/750 |

(Continued)

OTHER PUBLICATIONS

Gabrilovich et al., "Newsjunkie: Providing Personalized Newsfeeds via Analysis of Information Novelty," ACM, May 17-22, 2004, 9 pages.

(Continued)

*Primary Examiner* — Shiow-Jy Fan
(74) *Attorney, Agent, or Firm* — Fish & Richardson P.C.

(57) ABSTRACT

Methods, systems, and apparatus, including computer programs encoded on computer storage media, for document ranking. One of the methods includes receiving a request for one or more documents, obtaining a set of documents responsive to the request, and obtaining, from a user profile associated with a source of the request, representations of one or more topics of interest to a user. The method also includes selecting, from the set of documents, at least one document associated with a particular topic that matches at least one of the one or more topics of interest to the user, for the at least one selected document, obtaining a value corresponding to an inverse document frequency of documents associated with the particular topic in a corpus of documents, and generating a score for the at least one document based at least in part on the value corresponding to the inverse document frequency.

16 Claims, 8 Drawing Sheets

(56) References Cited

U.S. PATENT DOCUMENTS

| | | | |
|---|---|---|---|
| 8,892,549 B1* | 11/2014 | Thakur | G06F 17/30696 707/728 |
| 2002/0052901 A1* | 5/2002 | Guo | G06F 17/27 715/247 |
| 2006/0259272 A1* | 11/2006 | Sattler | G06F 17/30867 702/181 |
| 2006/0259473 A1* | 11/2006 | Li | G06Q 30/02 |
| 2009/0248678 A1* | 10/2009 | Okamoto | G06F 17/3071 |
| 2010/0153324 A1* | 6/2010 | Downs | G06F 17/2745 706/21 |
| 2010/0185606 A1* | 7/2010 | Kakiuchi | G06Q 10/10 707/723 |
| 2010/0293057 A1* | 11/2010 | Haveliwala | G06Q 30/0269 705/14.66 |
| 2011/0066588 A1* | 3/2011 | Xie | G06N 5/02 706/58 |
| 2011/0125791 A1* | 5/2011 | Konig | G06F 17/30864 707/770 |

OTHER PUBLICATIONS

Li et al., "Scene: A Scalable Two-Stage Personalized News Recommendation System," ACM, Jul. 24-28, 2011, 125-134.

* cited by examiner

DOCUMENT RANKING BASED ON ENTITY FREQUENCY

CROSS-REFERENCE TO RELATED APPLICATION

This application claims priority to U.S. Application Ser. No. 61/904,179, filed on Nov. 14, 2013, the entire contents of which are hereby incorporated by reference.

TECHNICAL FIELD

This specification generally relates to ranking documents based on the frequency of associated entities in a corpus of documents.

BACKGROUND

News recommendation systems may provide personalized news article recommendations based on user interests. For example, user interest profiles may be maintained for system users. Some systems may keep track of news articles a user has read and articles that have been read by other users who have similar interests to the user. Some systems may allow a user to explicitly express interest in particular topics to build a user interest profile. As additional news articles are published, an article may be recommended to the user when the topic of the article matches the user's interest profile or when similar users have read the article.

SUMMARY

A document such as a news article, blog post, or social media update may refer to one or more topics (e.g., entities). The frequency of an entity or of a group of two or more co-occurring entities in a corpus of documents may be used as a measure of rarity of the entity or the entity group. In general, users may be interested in documents that are related to rarely mentioned topics of interest, which may be a single entity or a group of two or more entities. Thus, according to one general aspect of the subject matter described in this specification, a measure of rarity can be used to rank a set of documents. A document referring to an entity or entity group that is infrequently referred to in other documents of the set may be promoted to users that are interested in the entity or entities.

One aspect of the subject matter described in this specification may be embodied in methods that include the actions of obtaining a set of documents from a corpus of documents, each document in the set being associated with one or more entities; for each of the one or more entities associated with each document in the set, determining a value corresponding to a frequency of the respective entity in the corpus of documents; storing each value corresponding to the frequency of each entity in the corpus of documents; and providing at least one of the stored values for ranking documents of interest to a user in response to a request for one or more documents.

This and other embodiments may each optionally include one or more of the following features. The value corresponding to the frequency of the respective entity in the corpus of documents can include an inverse document frequency of the respective entity in the corpus of documents. The value can correspond to a frequency of the respective entity in the corpus of documents as a document topic. The value can correspond to a frequency of the respective entity in the corpus of documents during a predetermined timeframe.

Another aspect of the subject matter described in this specification may be embodied in methods that include the actions of receiving a request for one or more documents; obtaining a set of documents responsive to the request; obtaining data corresponding to a set of entities of interest to a user; selecting, from the set of documents, at least one document associated with an entity that is in the set of entities of interest to the user; for the at least one document, obtaining a value corresponding to a frequency of the associated entity in a corpus of documents; and generating a score for the at least one document based at least in part on the value corresponding to the frequency of the associated entity in the corpus of documents.

This and other embodiments may each optionally include one or more of the following features. The set of documents that are responsive to the request for one or more documents can be ranked, and the at least one document can be ranked based at least in part on the respective generated score. Information associated with one or more of the ranked documents can be transmitted to the user. The value corresponding to the frequency of the associated entity in the corpus of documents can include an inverse document frequency of the entity in the corpus of documents. The data corresponding to the set of entities of interest to the user can include a set of entity identifiers of entities of interest to the user. Generating a score for the at least one document based at least in part on the value corresponding to the frequency of the associated entity in the corpus of documents can include generating an initial score for the at least one document, and based on determining that the value corresponding to the frequency of the associated entity satisfies a threshold, incrementing the score for the at least one document. Generating a score for the at least one document based at least in part on the value corresponding to the frequency of the associated entity in the corpus of documents can include adding an amount to the score of the at least one document, the amount being a function of the value corresponding to the frequency of the associated entity. The at least one document can be selected based on having a topic that is in the set of entities of interest to the user, and the value can correspond to a frequency of the associated entity in the corpus of documents as a document topic.

Another aspect of the subject matter described in this specification may be embodied in methods that include the actions of obtaining a set of documents from a corpus of documents, each document in the set being associated with a plurality of entities; for each document in the set of documents, generating a set of entity groups from the associated plurality of entities, the set of entity groups comprising combinations of entities selected from the plurality of entities; for each entity group from the set of entity groups, determining a value corresponding to a frequency of the entity group in the corpus of documents; storing the value corresponding to the frequency of each entity group; and providing at least one of the stored values for ranking documents of interest to a user in response to a request for one or more documents.

This and other embodiments may each optionally include one or more of the following features. The value corresponding to the frequency of each entity group in the corpus of documents can include an inverse document frequency of the entity group in the corpus of documents. The value can correspond to a frequency of the entity group in the corpus of documents as co-occurring document topics. The value can correspond to a frequency of the entity group in the corpus of documents during a predetermined timeframe.

Another aspect of the subject matter described in this specification may be embodied in methods that include the actions of receiving a request for one or more documents; obtaining a set of documents responsive to the request; obtaining data corresponding to a set of entities of interest to a user; selecting, from the set of documents, at least one document associated with an entity group, the entity group being represented in the set of entities of interest to the user; for the at least one document, obtaining a value corresponding to a frequency of the entity group in a corpus of documents; and generating a score for the at least one document based at least in part on the value corresponding to the frequency of the entity group in the corpus of documents.

This and other embodiments may each optionally include one or more of the following features. The set of documents that are responsive to the request for one or more documents can be ranked, and the at least one document can be ranked based at least in part on the respective generated score. One or more of the ranked documents can be transmitted to the user. The value corresponding to the frequency of the entity group in the corpus of documents can include an inverse document frequency of the entity group in the corpus of documents. The data corresponding to the set of entities of interest to the user can include a set of entity identifiers of entities of interest to the user. Generating a score for the at least one document based at least in part on the value corresponding to the frequency of the entity group in the corpus of documents can include generating an initial score for the at least one document, and based on determining that the value corresponding to the frequency of the entity group satisfies a threshold, incrementing the score for the at least one document. Generating a score for the at least one document based at least in part on the value corresponding to the frequency of the entity group in the corpus of documents can include adding an amount to the score of the at least one document, the amount being a function of the value corresponding to the frequency of the entity group. The at least one document can be selected based on having co-occurring topics. Each of the topics can be in the set of entities of interest to the user, and the value can correspond to a frequency of the entity group in the corpus of documents as co-occurring document topics.

Other embodiments of these aspects include corresponding systems, apparatus, and computer programs, configured to perform the actions of the methods, encoded on computer storage devices.

Implementations described in this specification may realize one or more of the following advantages. In some implementations, rarely documented entities or entity groups may be identified from a corpus of documents by calculating the Inverse Document Frequency (IDF) for each entity or entity group—a robust approach. As rarely documented entities or entity groups may be especially interesting to users who are interested in such topics, the calculated IDF may be used as an indication of interestingness, and may be used to promote documents, e.g., news articles, blog posts, social media updates, etc., so that interesting documents may surface among a corpus of documents.

The details of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In general, users may be interested in documents (e.g., news articles, blog posts, social media updates, etc.) that are related to topics of interest (e.g., entities). A measure of rarity can be used as an indication of possible interestingness to a user, and can be used to rank a list of documents to be presented to the user. A document that refers to an entity or entity group that is infrequently referred to in the set of documents may be promoted to a user that is interested in the entity or entities.

Figure 1:
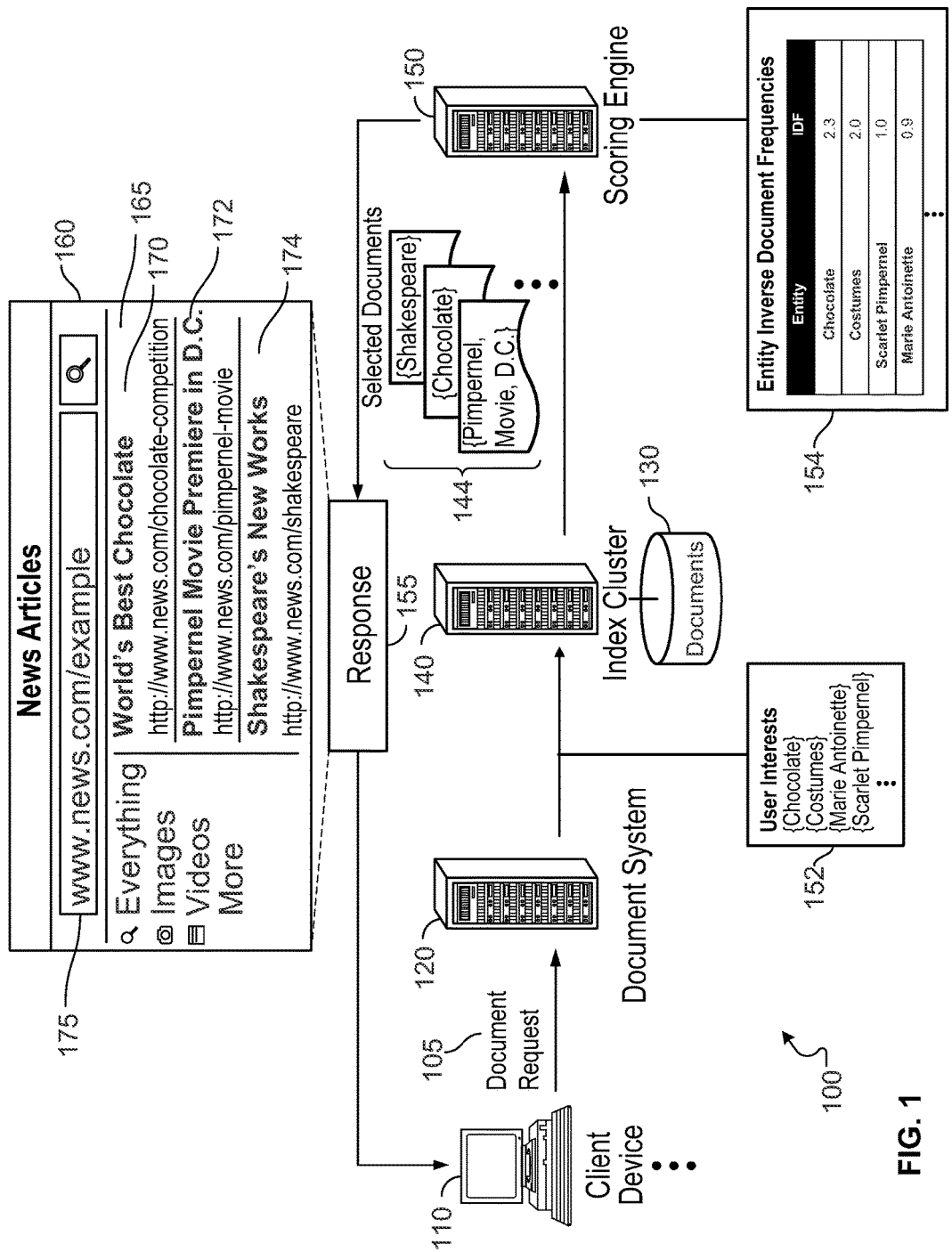
FIG. 1 is a diagram of an example system that ranks documents based on entity frequency.

FIG. 1 shows an example system 100 that ranks documents based on entity frequency. The system 100 includes a client device 110, a document system 120, an index cluster 140, and a scoring engine 150. The client device 110, for example, may include one or more processing devices, and may be, or include, a mobile telephone (e.g., a smartphone), a laptop computer, a handheld computer, a tablet computer, a network appliance, a camera, an enhanced general packet radio service (EGPRS) mobile phone, a media player, a navigation device, an email device, a game console, an interactive or so-called "smart" television, or a combination of any two or more of these data processing devices or other data processing devices. The system 100, for example, may include many client devices, each operated by one or more users.

The document system 120, index cluster 140 and scoring engine 150 can each include one or more processors configured to execute one or more machine executable instructions or pieces of software, firmware, or a combination thereof. The document system 120, index cluster 140 and scoring engine 150 can each also include an operating system and one or more computer memories, for example a main memory, configured to store one or more pieces of data, either temporarily, permanently, semi-permanently, or a combination thereof. The memory may include any type of storage device that stores information in a format that can be read and/or executed by a processor. Memory may include volatile memory, non-volatile memory, or a combination thereof, and store modules that, when executed by a processor, perform certain operations.

As shown in FIG. 1, the client device 110 can be used to submit a request 105 for one or more documents, e.g., news articles, blog posts, social media updates, etc. For example, a user can use the client device 110 (e.g., using a web browser, a blogging application, a social media application, a custom application, etc.) to access information (e.g., documents, news articles, blog posts, social media updates, etc.) from the document system 120. In the present example, the user directs a web browser 160 to a news website 165 (e.g., www.news.com/example) by providing the website's address by interacting with a navigation control 175. In some implementations, a custom application (e.g., a mobile device application) may be used to interact with a web service that provides information to a user. For example, the custom application can request information from a web service associated with the document system 120. In some implementations, the document request 105 may include a user identifier associated with the user of the client device 110. For example, the user identifier may be provided by the user (e.g., by logging in to the website 165), may be provided by the web browser 160 (e.g., as a file or through a method call), and/or may be provided by the client device 110.

The document system 120 receives the document request 105, e.g., including a request for news articles and a user identifier, from the client device 110. The document system 120, for example, can log the user into the system and can access the user's profile information. For example, the user's profile may include information such as a list of documents that the user has previously accessed, document access times, entities that are topical to the documents, and a set of user interests 152. User interest in an entity may be represented by a value. For example, a binary value (e.g., "interested" and "not interested") may be used to represent user interest or lack of interest in an entity. As another example, a level of interest may be represented by a range of discrete values, or by a continuous value.

In some implementations, user interests may be specified by the user. For example, the set of user interests 152 may be based at least in part on interest information provided by the user to the document system 120, e.g., by user entry, selection from a list of interests, or another suitable technique. As an example, when providing a document to a user, the document system 120 can associate the document with a control through which the user may explicitly indicate that in the future, the system is to provide additional documents which are related to the topic of the provided document.

In some implementations, user interests may be determined by the document system 120. For example, the set of user interests 152 may be based at least in part on the topics of documents that the user has previously accessed, search queries previously entered by the user, etc. In the present example, the user's interests include Chocolate, Costumes, Marie Antoinette, and the Scarlet Pimpernel, possibly among other interests.

A set of documents is obtained, responsive to the document request 105. For example, the document system 120 can communicate with the index cluster 140, which can access a corpus of documents 130 to retrieve the set of documents. The corpus of documents 130, for example, may include news articles, blog posts, social media updates, etc., as the documents are created and made available to users. In some implementations, recently created documents may be retrieved. For example, documents created within the past hour, day, week, etc., can be retrieved from the corpus of documents 130 by the index cluster 140. In some implementations, documents may be retrieved regardless when the documents were created. In the present example, the set of documents retrieved by the index cluster 140 from the corpus of documents 130 includes news articles that were recently published by "www.news.com/example" for availability to users. In some implementations, documents that include one or more topics of interest to a user may be retrieved. For example, if each document in the corpus of documents 130 has been annotated with one or more topics, documents having topics that match the set of user interests 152 can be selected and retrieved.

Figure 2:
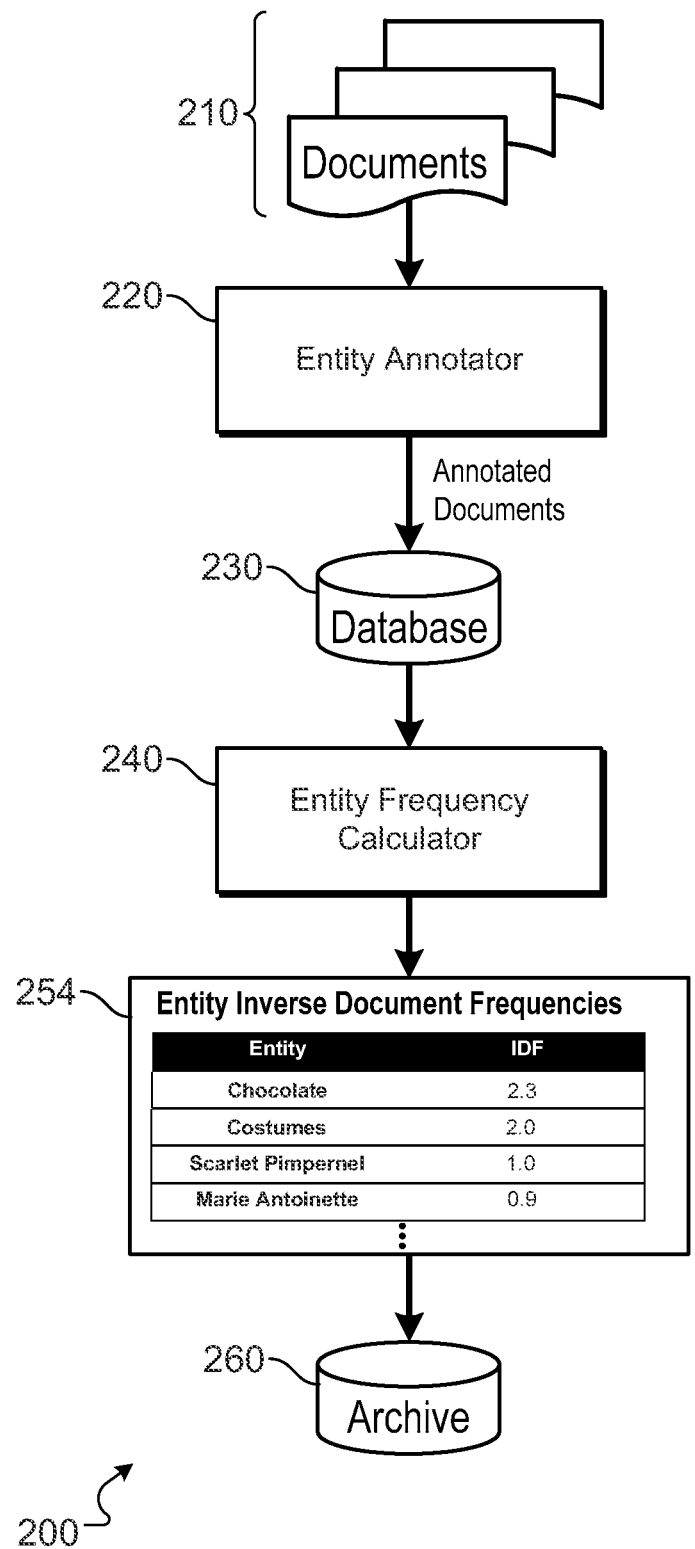
FIG. 2 is a diagram of an example system that annotates documents with entities and calculates entity frequencies.

Documents can be annotated with one or more topics, or entities, as discussed in further detail in association with FIG. 2. In general, an entity may be an instance of a noun class, such as a person (e.g., Marie Antoinette), a place (e.g., Washington, D.C.), a thing (e.g., Chocolate), classifications (e.g., noble gasses), abstract concepts (e.g., love), or schools of thought (e.g., Impressionism). Entities may be associated with unique identifiers, and may be associated with one or more types which contain related properties to describe certain aspects of an entity (e.g., Marie Antoinette was the Queen of France and Navarre from the years 1774 to 1792). The relationships between entities may be stored as a graph structure, with the entities represented by nodes and the relationships as edges. When annotating a document with one or more entities, for example, the topicality, or relevance of each entity referenced in the document may be determined to identify a document topic or combination of topics.

One or more documents are selected, based at least in part on the interests of a user. For example, the index cluster 140 can select a set of documents 144 that may include documents of general interest, documents that have been accessed by users with similar profiles as the user, documents that have been accessed by users who are connected to the user on a social network, and/or documents that are related to topics of interest to the user. In the present example, the documents 144 include a news article about Shakespeare (e.g., Shakespeare's New Works), another about Chocolate (e.g., the World's Best Chocolate Competition), and another about the Scarlet Pimpernel, Movies, and Washington, D.C. (e.g., an upcoming Scarlet Pimpernel Movie Premiere in D.C.). The news article about Shakespeare, for example, may be a trending article of general interest, whereas the articles about Chocolate and about the Scarlet Pimpernel/Movies/D.C., for example, may be selected by the index cluster 140 based on the articles having at least one entity in common with the entities included in the set of user interests 152.

The documents in the set of selected documents 144 are scored and ranked, such that documents may be promoted that are associated with one or more topics—or mention one or more entities—that are determined to be uncommon and are of interest to the user. In the present example, the scoring engine 150 can access a set of entity inverse document frequency values 154 that correspond to the frequency of various entities in the corpus of documents 130. As users may generally be interested in documents that are about entities of interest that are rarely mentioned, an inverse document frequency value may be used as a measure of possible interestingness of an entity to a user.

In some implementations, frequency values may be calculated by using an inverse document frequency (IDF) algorithm. A low IDF value may indicate that an entity is frequently a document topic in a corpus of documents, or that the entity is frequently mentioned. Conversely, a high IDF value may indicate that an entity is infrequently a document topic in a corpus of documents, or that the entity is infrequently mentioned. In the present example, the entities Chocolate, Costumes, the Scarlet Pimpernel, and Marie Antoinette are associated with the inverse document frequency values of 2.3, 2.0, 1.0, and 0.9, respectively. Thus, in the present example, Chocolate and Costumes are both relatively uncommon news article topics (and/or are infrequently mentioned), whereas Marie Antoinette and the Scarlet Pimpernel are both relatively common topics (and/or are frequently mentioned).

Based at least in part on the entity inverse document frequency values 154, the scoring engine 150 can assign or adjust a score for each of the selected documents 144 in the present example. A score for the selected news article about Shakespeare may be unadjusted, for example, as the document's topic is not present in the set of user interests 152. As another example, a score for the selected news article about Chocolate and a score for the selected news article about the Scarlet Pimpernel, Movies, and Washington, D.C., may each be positively adjusted, based on the inclusion of at least one of the topics in the set of user interests 152. Moreover, the score associated with the selected news article about Chocolate may be positively adjusted to a greater degree than the score associated with the selected news article about the Scarlet Pimpernel, Movies, and Washington, D.C., for example, based at least in part on their respective entity inverse document frequency values. The scoring engine 150 can use document scores as a factor in ranking the selected documents 144, for example. In the present example, according to their adjusted scores, the news article about Chocolate (e.g., the World's Best Chocolate Competition) receives a high ranking, the news article about the Scarlet Pimpernel, Movies, and Washington, D.C. (e.g., an upcoming Scarlet Pimpernel Movie Premiere in D.C.) receives an intermediate ranking, and the news article about Shakespeare (e.g., Shakespeare's New Works) receives a low ranking.

Information associated with a set of ranked documents may be transmitted to the user. In the present example, a response 155 to the document request 105 is provided by the document system 120. The response 155, for example, can include information for rendering the website 165, and may include a set of links 170 (e.g., a link to the news article about the World's Best Chocolate Competition), 172 (e.g., a link to the news article about the upcoming Scarlet Pimpernel Movie Premiere in D.C.), and 174 (e.g., a link to the news article about Shakespeare's New Works). A page of the website 165, for example, can be presented to the user by the web browser 160 and the client device 110. Upon viewing the website's page, for example, the user may review the links 170, 172, and 174, and may select a link if interested in reading the corresponding news article. As another example, a custom application (e.g., a mobile device application) can present a ranked list of selectable items (e.g., cards) including a summary (e.g., a headline) pertinent to each of the selected documents 144, and additional metadata associated with each document. For example, the metadata may include recency information (e.g., "posted three hours ago"), a list of entities and/or topic entities associated with the document, and/or a description of the relevance of one or more associated entities to a user (e.g., "you asked to be updated about The Scarlet Pimpernel").

In general, by promoting documents that include topics of interest to a user that are rarely mentioned in other documents, the user's experience may be improved. For example, if the recency of a news article is used as the primary factor in ranking the article in a list of articles to be presented to a user, the user may be deluged with articles about trending topics. As another example, if user interests are used as the primary factor in ranking an article in a list of articles, the user may be deluged with articles that may align with the user's interests, but may include common subject matter to which the user has previously been exposed, to an extent that the subject matter may have become less interesting with repeated exposure. By considering user interests in conjunction with the frequency of those interests in a set of recent documents, for example, interesting news articles with uncommon subject matter may surface which otherwise may have been buried in a stream of other articles.

FIG. 2 shows an example system 200 that annotates documents with entities and calculates entity frequencies. Components of the system 200 may be associated with the document system 120 (shown in FIG. 1), for example, and may be used to generate data which may subsequently be used by the document system 120, the index cluster 140 (also shown in FIG. 1), and the scoring engine 150 (also shown in FIG. 1) to handle document requests and responses.

The system 200 includes an entity annotator 220, a document database 230, an entity frequency calculator 240, and an entity frequency archive 260. The entity annotator 220 and the entity frequency calculator 240, for example, may include software, firmware, and/or hardware configured to perform operations of the system 200. The document database 230 and the entity frequency archive 260, for example, may include one or more databases, file systems, memory modules, etc., for persisting and managing data to be used by the system 200.

As shown in FIG. 2, a set of documents 210 can be provided to the entity annotator 220. For example, as each of the documents 210 is made available (e.g., as news articles are published, as blog posts are posted, as social media updates are entered, etc.), the entity annotator 220 can analyze the document and annotate the document with one or more entities that are included in the document. As another example, documents may be analyzed and annotated by the entity annotator 220 as a batch process. In some implementations, weight scores (e.g., "topicality" scores) may be determined for each of the entities referenced by a document. If a document references a single entity, for example, that entity may be associated with a full weight score for the document. As another example, if a document references multiple entities, each entity may be associated with a weight score proportional to its significance (e.g., percentage of content) within the document.

In some implementations, one or more entities may be designated as a document topic, based on one or more predetermined criteria. For example, if a document references a single entity, the entity annotator 220 may designate that entity as the document's topic. As another example, if a document references multiple entities, the entity annotator 220 may designate the entity that is associated with the highest weight score as the document's topic. As another example, if a document references multiple entities, each of the entities that are associated with a weight score meeting a predetermined threshold may be designated as document topics. In some implementations, if a document references multiple entities, the document may be associated with each of the entities. In some implementations, multiple entities may be designated as document topics, up to a predetermined topic limit. For example, the entity annotator 220 can identify a subset of document entities that are associated with high weight values relative to weight values of the other entities (e.g. the top two, top three, top four, etc.), and can designate each of the entities in the subset as document topics.

Annotated documents can be persisted and maintained by the document database 230 (e.g., similar to the corpus of documents 130, shown in FIG. 1). The entity frequency calculator 240, for example, can access the document database 230 to determine the frequency of each of the entities identified by the entity annotator 220 in the corpus of documents. In some implementations, the frequency of entities as document topics may be calculated. For example, the entity frequency calculator 240 can access the document database 230 to determine the frequency of each of the entities identified by the entity annotator 220 as document topics (e.g., as a sole topic and/or as one of the topics in a group of topics) in the corpus of documents. In the present example, a set of entity inverse document frequency values 254 (e.g., similar to the set of entity inverse document frequency values 154, shown in FIG. 1) can be generated.

In some implementations, a corpus of documents may be filtered by a timeframe when calculating entity frequency. For example, the entity frequency calculator 240 can access the document database 230 to identify documents that have been created (e.g., published, posted, updated, etc.) during a particular time period (e.g., the past hour, day, week, bi-week, month, etc.), and can calculate entity frequency and/or topic entity frequency over the time period. As the frequency of which entities are mentioned in or are the topic of news articles may change over time, a subject that may be infrequent during one period of time (e.g., Santa Claus in July) may be commonplace during another period of time (e.g., Santa Claus in December). By periodically recalculating entity frequency, for example, the system 200 can ensure that entity frequencies reflect a current corpus of documents.

The set of entity inverse document frequency values 254 can be stored by the entity frequency archive 260. For example, the archive 260 may maintain frequency values associated with a currently relevant time period, and may maintain frequency values associated with prior time periods. The entity inverse document frequency values 254 can be provided to the scoring engine 150 to be used in scoring and ranking documents of interest to a user, for example.

Figure 3:
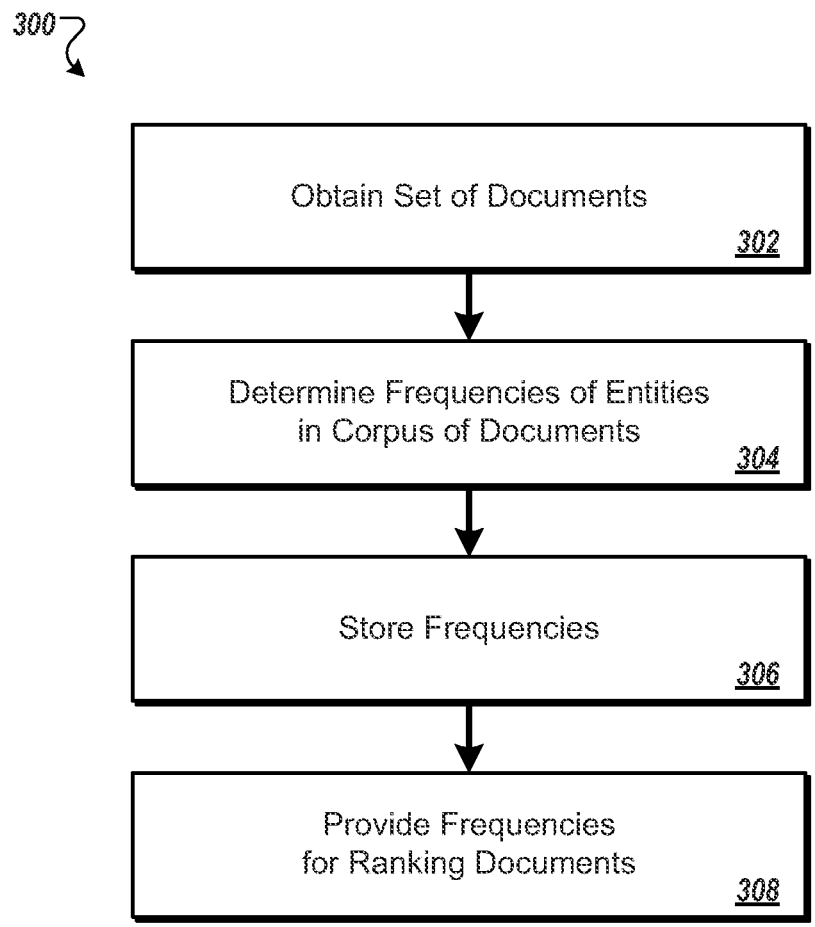
FIG. 3 is a flow chart of an example process for determining values corresponding to frequencies of entities in a corpus of documents.

FIG. 3 is a flow chart of an example process 300 for determining values corresponding to frequencies of entities in a corpus of documents. The process 300 will be described as being performed by an entity frequency calculator, for example, the entity frequency calculator 240 of FIG. 2. In general, a set of documents is obtained, the frequencies of document entities in a corpus of documents are determined, and frequency information is stored and provided for ranking documents.

In step 302, a set of documents is obtained from a corpus of documents. Referring to FIG. 2, for example, the entity frequency calculator 240 can obtain a set of documents (e.g., news articles, blog posts, social media updates, etc.) from the document database 230. Each document in the set is associated with one or more entities. For example, each document in the set of documents obtained from the document database 230 may have been previously annotated by the entity annotator 220 as documents are made available (e.g., as news articles are published, as blog posts are posted, as social media updates are entered, etc.). A document's association with an entity may include a mention of the entity within the document, for example. As another example, a document's association with an entity may include a designation of the entity as a document topic. In some implementations, documents may be annotated with one or more entities associated with a document's author and/or publisher. For example, the author or publisher of a news article, blog post, social media update, etc., can be associated with an entity which is then associated with the document.

In step 304, for each of the one or more entities associated with each document in the set, a value is determined that corresponds with a frequency of the respective entity in the corpus of documents. For example, if a document in the set of documents obtained from the document database 230 has been annotated with an entity (e.g., a document includes the word "chocolate", a word or phrase associated with a type of chocolate, a word or phrase associated with a brand of chocolate, etc.), the entity can be included in a set of documented entities (e.g., maintained by the document database 230). For each of the documented entities, for example, the entity frequency calculator 240 can determine a total number of instances of the entity within the corpus of documents stored by the document database 230 (e.g., the previously annotated documents).

In some implementations, the value may correspond to a frequency of the respective entity in the corpus of documents as a document topic. For example, the entity annotator 220 can determine a weight score for each entity associated with a document, based on a proportion of a number of instances of the entity in the document relative to other entity instances, based on one or more positional placements of the instances within the document, based on a reference to the entity in the document's title, and/or other suitable factors. If an entity's weight score satisfies a predetermined threshold for a particular document, for example, the entity may be designated as a topic of the document. In general, documents may include a single topic, or may include multiple co-occurring topics. Each document topic can be included in a set of document topics (e.g., maintained by the document database 230). For each of the document topics, for example, the entity frequency calculator 240 can determine a total number of instances of the topic within the corpus of documents stored by the document database 230 (e.g., the previously annotated documents) as a document topic.

In some implementations, the value may correspond to a frequency of the respective entity in the corpus of documents during a predetermined timeframe. For example, the entity frequency calculator 240 can identify documents from the document database 230 that have been created (e.g., published, posted, updated, etc.) during a particular time period (e.g., the past hour, day, week, bi-week, month, etc.), and can calculate entity frequency and/or topic entity frequency over the time period. In general, a set of entities or topic entities, and the frequencies of the entities or topic entities may change from one time period to another. By periodically filtering the corpus of documents stored by the document database 230 by timeframe, for example, data associated with entities and entity frequencies may reflect current circumstances.

In some implementations, the value corresponding to the frequency of the respective entity in the corpus of documents may include an inverse document frequency (IDF) of the respective entity in the corpus of documents. A low IDF value may indicate that instances of an entity are frequently included in a corpus of documents, or that the entity is a frequent document topic. Conversely, a high IDF value may indicate that instances of an entity are infrequently included in a corpus of documents, or that the entity is an infrequent document topic. In general, an IDF value of an entity or topic entity may be calculated by the entity frequency calculator 240 through the use of an algorithm that divides the total number of documents in a corpus of documents by the number of documents including an instance of the entity or topic entity. In some implementations, the logarithm of the resulting quotient may be taken, to smooth the results and to generate a suitable basis of comparison between entities or topic entities. For example, if a corpus of documents includes one thousand documents, and ten documents include instances of the entity Costumes (or include the entity Costumes as a topic), the logarithm can be taken of the resulting quotient of one thousand divided by ten, for an entity IDF value of two. In some implementations, before taking the logarithm, a value of one may be added to the divisor of the quotient. For example, if the frequency of an entity is zero, then the divisor will be zero and the quotient will be undefined—thus, a value of one can be added to the divisor to prevent such an occurrence.

In step 306, each value corresponding to the frequency of each entity in the corpus of documents is stored. For example, the set of entity inverse document frequency values 254 determined by the entity frequency calculator 240 can be stored by the archive 260. In the present example, the entity Chocolate is associated with an IDF value of 2.3, the entity Costumes is associated with an IDF value of 2.0, the entity the Scarlet Pimpernel is associated with an IDF value of 1.0, and the entity Marie Antoinette is associated with an IDF value of 0.9.

In step 308, at least one of the stored values is provided for ranking documents of interest to a user in response to a request for documents. Referring to FIG. 1, for example, upon receiving the document request 105 (e.g., a request for news articles), the document system 120 can use the index cluster 140 to retrieve one or more documents that may include entity instances or have topics that match the set of user interests 152. In the present example, the set of selected documents 144 includes a news article about Chocolate (e.g., the World's Best Chocolate Competition), and a news article about the Scarlet Pimpernel (e.g., an upcoming Scarlet Pimpernel Movie Premiere in D.C.). The scoring engine 150, for example, can access the set of entity inverse document frequency values 154 (e.g., similar to the set of entity inverse document frequency values 254) and can identify the value associated with Chocolate (e.g., 2.3) when scoring and/or ranking the news article about Chocolate, and can identify the value associated with the Scarlet Pimpernel (e.g., 1.0) when scoring and/or ranking the news article about the Scarlet Pimpernel.

Figure 4:
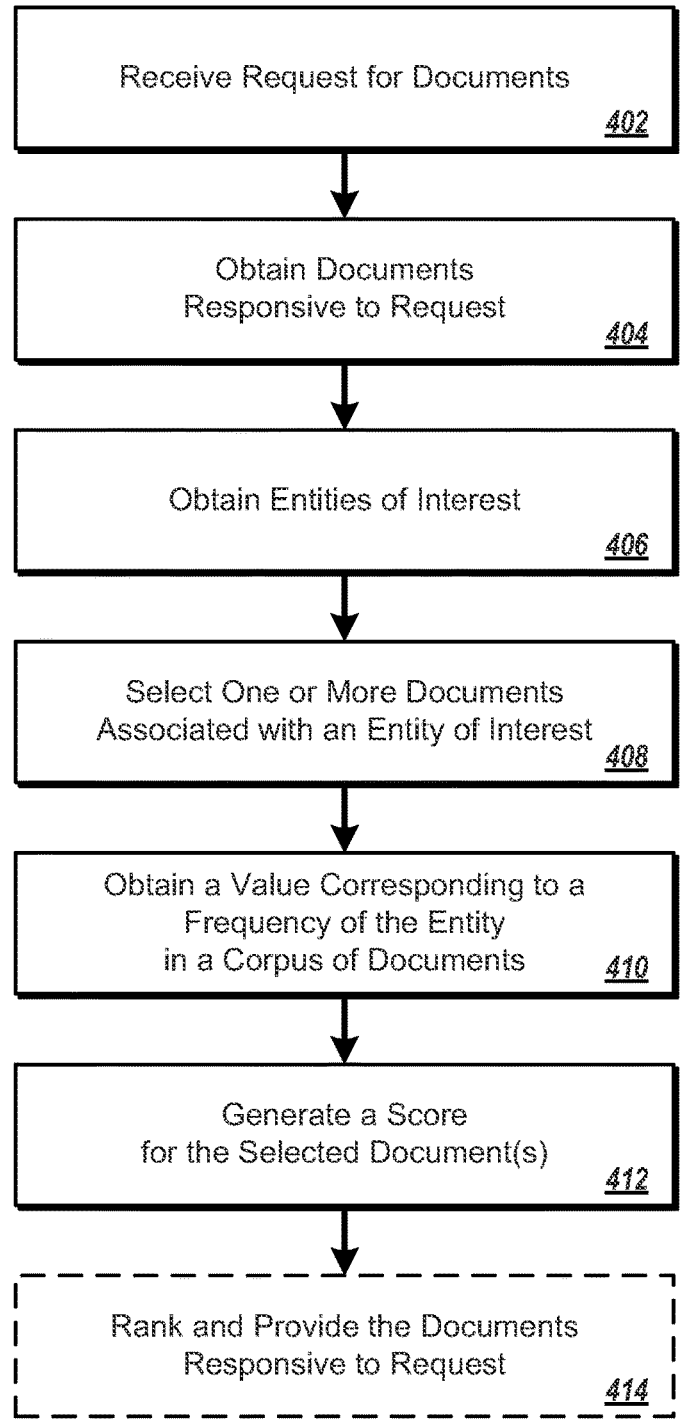
FIG. 4 is a flow chart of an example process for ranking documents based on entity frequency.

FIG. 4 is a flow chart of an example process 400 for ranking documents based on entity frequency. The process 400 will be described as being performed by a document system, index cluster, and scoring engine, for example, the document system 120, the index cluster 140, and the scoring engine 150 of FIG. 1. In some implementations, more or fewer system components may be used to perform the example process 400. For example, the process 400 may be performed by distributed or centralized systems. In general, a request for documents is received, documents responsive to the request are obtained, entities of interest to a user are obtained, and one or more documents associated with an entity of interest are selected. For at least one selected document, a value is obtained corresponding to a frequency of an associated entity in a corpus of documents, and a score is generated for the document. Based at least in part on the generated score, the documents may be ranked and provided to a user.

In step 402, a request for documents is received. Referring to FIG. 1, for example, the document system 120 can receive the request 105 for documents, e.g., news articles, blog posts, social media updates, etc., from the client device 110. The request for documents can be associated with a user. For example, the request 105 may include or may be associated with information (e.g., user identification information, login information, etc.) that is associated with a user of the client device 110. In the present example, the user of the client device 110 can use the web browser 160 to access the website 165 (e.g., www.news.com/example) which provides various news articles to the user. In some implementations, a custom application (e.g., a mobile device application) may be used to interact with a web service that provides information to a user. For example, the custom application can request information from a web service associated with the document system 120.

In step 404, a set of documents responsive to the request for documents is obtained. For example, the document system 120 can use the index cluster 140 to access the corpus of documents 130, which may include documents such as news articles, blog posts, social media updates, etc. In the present example, the set of documents can include recent news articles published by and/or aggregated by the news website 165. As another example, documents can be retrieved that have been annotated with one or more topics and that include one or more topics of interest to a user.

In step 406, data corresponding to a set of entities of interest to the user is obtained. For example, the document system 120 and/or the index cluster 140 can obtain the set of user interests 152 associated with the user of the client device 110. In the present example, the user's interests include Chocolate, Costumes, Marie Antoinette, and the Scarlet Pimpernel, possibly among other interests. In some implementations, the data corresponding to the set of entities of interest to the user may include a set of entity identifiers of entities of interest to the user. For example, each of the entities of interest included in the set of user interests 152 may be associated with an entity identifier that uniquely identifies the entity as a particular noun class. The entity "Chocolate", for example, may be associated with an entity identifier that disambiguates the entity from other entities with a similar name—that is, as a foodstuff, and not as a song by a rock band, nor as a martial arts film.

In step 408, at least one document is selected that is associated with an entity that is in the set of entities of interest to the user. For example, the index cluster 140 can refer to the set of user interests 152 when selecting the set of selected documents 144. In the present example, the selected documents 144 include a general news article (e.g., an article discussing Shakespeare's New Works), another article about a single entity that is an entity of interest of the user (e.g., an article discussing the World's Best Chocolate Competition), and another article about multiple entities, one of which is an entity of interest to the user (e.g., an article discussing an upcoming Scarlet Pimpernel Movie Premiere in D.C.).

In some implementations, document(s) may be selected based on having a topic that is in the set of entities of interest to the user. For example, the entity annotator 220 (shown in FIG. 2) may have previously designated one or more entities as topics of a document, based on weight scores of the entities in association with the document. In the present example, Chocolate may have been designated as the topic of the news article about the World's Best Chocolate Competition, and the article may be selected based at least in part on Chocolate being an entity of interest to the user.

In step 410, for the selected document(s), a value is obtained that corresponds to a frequency of the associated entity in a corpus of documents. For each of the entities of interest that are associated with one or more of the selected documents 144, for example, the scoring engine 150 can obtain a value corresponding to a frequency of the entity within the corpus of documents 130, from the set of entity inverse document frequency values 154. In some implementations, the set of entity inverse document frequency values may include values corresponding to a frequency of an entity in the corpus of documents during a predetermined timeframe (e.g., the past hour, day, week, bi-week, month, etc.). For example, the entity frequency calculator 240 (shown in FIG. 2) can periodically calculate entity and/or topic entity frequencies for documents that were created (e.g., published, posted, updated, etc.) during the timeframe. In some implementations, the value may correspond with a frequency of the associated entity in the corpus of documents as a document topic. For example, the entity Chocolate and the entity the Scarlet Pimpernel may each be document topics or co-occurring topics for one or more documents in the corpus of documents 130.

In some implementations, the value corresponding to the frequency of the associated entity in the corpus of documents may include an inverse document frequency (IDF) of the entity in the corpus of documents. For example, the entity Chocolate may be associated with an IDF value of 2.3, and the entity the Scarlet Pimpernel may be associated with an IDF value of 1.0. Thus, in the present example, the entity Chocolate may occur less frequently than the Scarlet Pimpernel as an entity or topic entity within the corpus of documents 130 for a recent timeframe, and thus documents about Chocolate may generally be more interesting than documents about the Scarlet Pimpernel to users that are interested in both entities.

In step 412, a score is generated for the selected document(s). For example, the scoring engine 150 can generate a score for each of the documents in the set of selected documents 144. The score is based at least in part on the value corresponding to the frequency of the associated entity in the corpus of documents. In the present example, a score for the selected news article about Shakespeare may be unadjusted, as the document's topic is not present in the set of user interests 152, whereas a score for the selected news article about Chocolate and a score for the selected news article about the Scarlet Pimpernel may each be positively adjusted, based on the inclusion of at least one of the topics in the set of user interests 152.

In some implementations, generating a score for the document(s) may include generating an initial score for the document(s), and, based on determining that the value corresponding to the frequency of the associated entity satisfies a threshold, incrementing the score for the at least one document. Incrementing a score, for example, may include adding an amount to the score, and/or multiplying the score by a value. For example, the scoring engine 150 can generate initial scores for each of the selected documents 144. Initial scores, for example, may be based on one or more factors, such as relevance scores (e.g., based on a submitted search query, a request for a particular type of information, etc.), quality scores (e.g., based on user ratings, click rates, etc.), and other suitable factors. A predetermined threshold may be specified as an indication of entity rarity, and thus possible interestingness to a user. In the present example, a threshold entity inverse document frequency value of 2.0 can be specified as a threshold value—document scores for documents including entities of interest having a value that satisfies the threshold (e.g., having a value greater than or equal to the threshold value), for example, may be incremented. Thus, in the present example, a document score for the news article about Chocolate (e.g., an entity associated with an entity inverse document frequency value of 2.3) may be incremented, whereas a document score for the news article about the Scarlet Pimpernel (e.g., an entity associated with an entity inverse document frequency value of 1.0) may be unadjusted.

In some implementations, generating a score for the document(s) may include adding an amount to the document's score. The amount can be a function of the value corresponding to the frequency of the associated entity. For example, a continuous or step function can be used to adjust document scores, such that scores for documents that include entities or topic entities that are determined to be less frequent relative to other entities or topic entities in a corpus of documents can be incremented to a greater degree than scores for documents that include entities or topic entities that are determined to be more frequent. In the present example, an incremental adjustment score applied to the initial score for the news article about Chocolate (e.g., an entity associated with an entity inverse document frequency value of 2.3) may be proportionally greater than an incremental adjustment score applied to the initial score for the news article about the Scarlet Pimpernel (e.g., an entity associated with an entity inverse document frequency value of 1.0).

In step 414, the set of documents that are responsive to the request for one or more documents may be optionally ranked and provided to the user. Each of the selected document(s) may be ranked, based at least in part on its respective generated score. For example, the generated scores for each of the selected documents 144 (e.g., the news article about Shakespeare, the news article about Chocolate, and the news article about the Scarlet Pimpernel) can be compared by the scoring engine 150 to determine a document ranking. In the present example, based on their respective scores, the news articles about Chocolate, the Scarlet Pimpernel, and Shakespeare may be ranked first, second, and third, respectively. Information associated with one or more of the ranked documents may be transmitted to the user. In the present example, information about each of the ranked documents can be provided by the document system 120 to the client device 110 in the form of the response 155, which can include information for rendering the news website 165. The information for rendering the website 165, for example, can include a set of links 170 (e.g., a link to the news article about the World's Best Chocolate Competition), 172 (e.g., a link to the news article about the upcoming Scarlet Pimpernel Movie Premiere in D.C.), and 174 (e.g., a link to the news article about Shakespeare's New Works), and can be presented by the website to the user according to the ranked order of the corresponding documents. Thus, in the present example, a document associated with an infrequently documented entity of interest (e.g., Chocolate) may be presented to the user in a more prominent position (e.g., above) than a document associated with a common or frequently documented entity of interest (e.g., the Scarlet Pimpernel).

Figure 5:
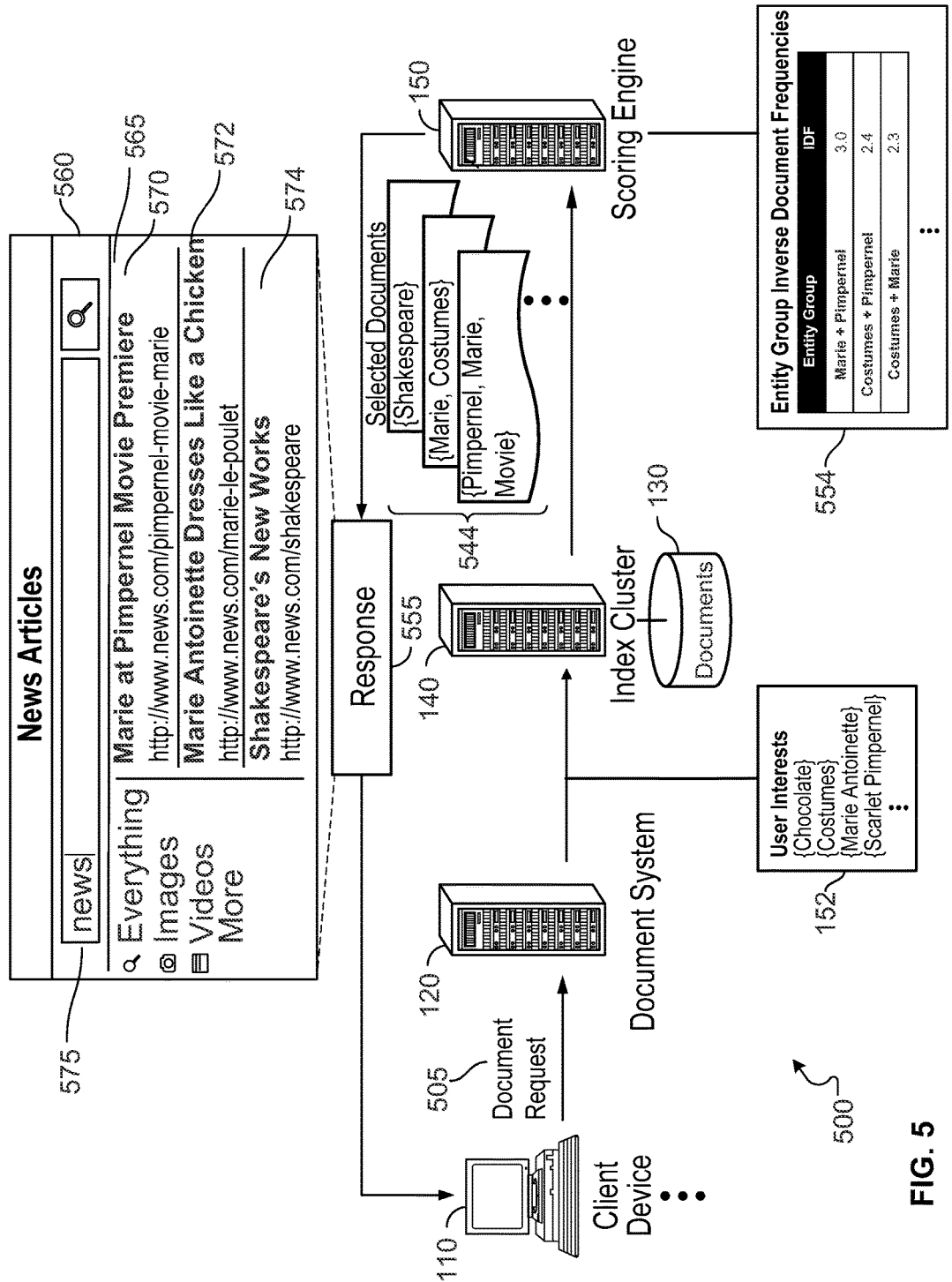
FIG. 5 is a diagram of an example system that ranks documents based on entity group frequency.

FIG. 5 shows an example system 500 that ranks documents based on entity group frequency. Similar to the system 100 (shown in FIG. 1), for example, the system 500 includes the client device 110, the document system 120, the index cluster 140, and the scoring engine 150.

As shown in FIG. 5, the client device 110 can be used to submit a request 505 for one or more documents, e.g., news articles, blog posts, social media updates, etc. For example, a user can use the client device 110 (e.g., using a web browser, a blogging application, a social media application, a custom application, etc.) to access information (e.g., documents, news articles, blog posts, social media updates, etc.) from the document system 120. In the present example, the user directs a web browser 560 to a news website 565 (e.g., www.news.com/example) by providing the website's address by interacting with a navigation control 575. In some implementations, the document request 505 may include a user identifier associated with the user of the client device 110. For example, the user identifier may be provided by the user (e.g., by logging in to the website 565), may be provided by the web browser 560 (e.g., as a file or through a method call), and/or may be provided by the client device 110.

The document system 120 receives the document request 505, e.g., including a request for news articles and a user identifier, from the client device 110. The document system 120, for example, can log the user into the system and can access the user's profile information. For example, the user's profile may include information such as a list of documents that the user has previously accessed, document access times, entities that are topical to the documents, and a set of user interests 152. User interest in an entity may be represented by a value. For example, a binary value (e.g., "interested" and "not interested") may be used to represent user interest or lack of interest in an entity. As another example, a level of interest may be represented by a range of discrete values, or by a continuous value.

A set of documents is obtained, responsive to the document request 505. For example, the document system 120 can communicate with the index cluster 140, which can access a corpus of documents 130 to retrieve the set of documents. The corpus of documents 130, for example, may include news articles, blog posts, social media updates, etc., as the documents are created and made available to users. In some implementations, recently created documents may be retrieved. For example, documents created within the past hour, day, week, etc., can be retrieved from the corpus of documents 130 by the index cluster 140. In some implementations, documents may be retrieved regardless when the documents were created. In the present example, the set of documents retrieved by the index cluster 140 from the corpus of documents 130 includes news articles that were recently published by "www.news.com/example" for availability to users. In some implementations, documents that include one or more topics of interest to a user may be retrieved. For example, if each document in the corpus of documents 130 has been annotated with one or more topics, documents having topics that match the set of user interests 152 can be selected and retrieved.

Figure 6:
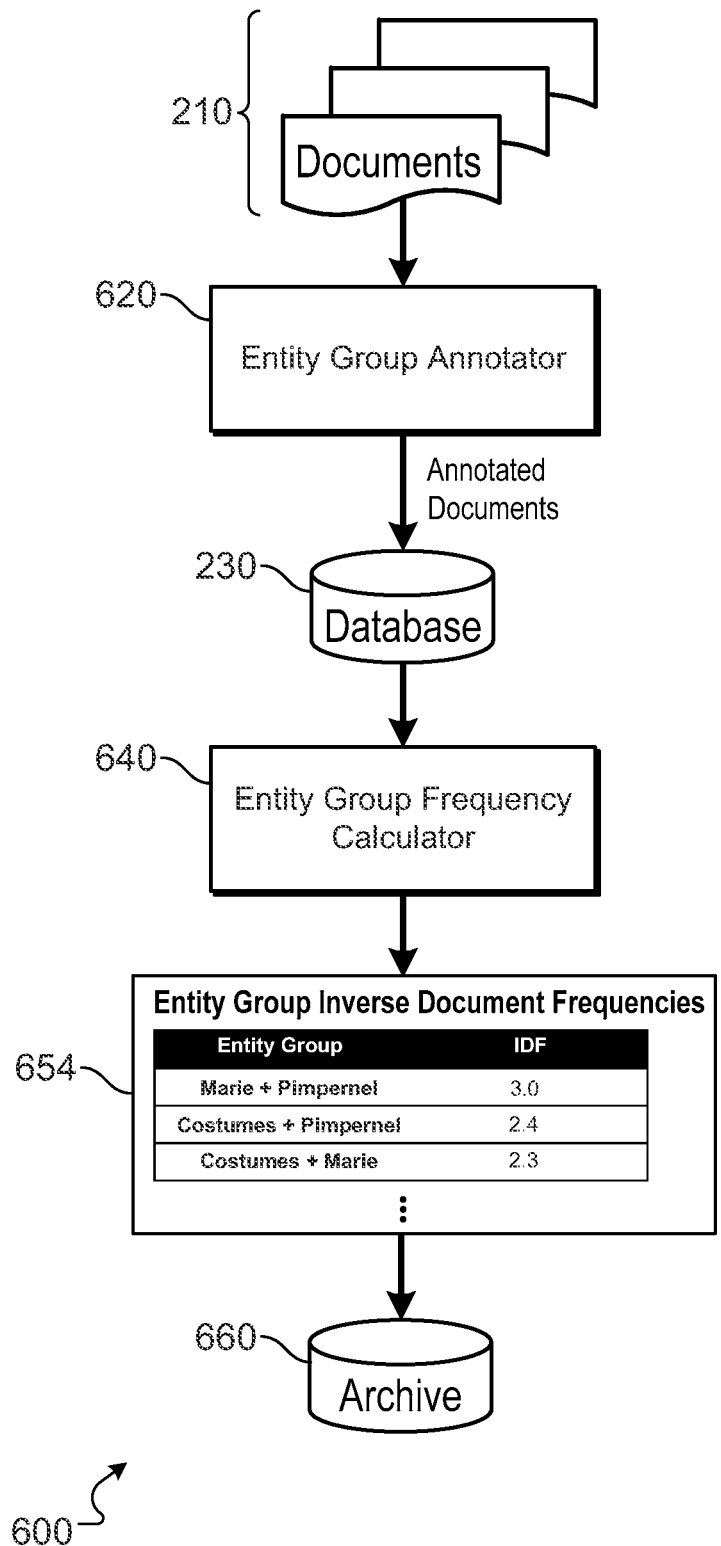
FIG. 6 is a diagram of an example system that annotates documents with entities and calculates entity group frequencies.

Documents can be annotated with one or more topics, or entities, as discussed in further detail in association with FIG. 6. In general, an entity may be an instance of a noun class, such as a person (e.g., Marie Antoinette), a place (e.g., Washington, D.C.), a thing (e.g., Chocolate), or a general concept. When annotating a document with one or more entities, for example, the topicality, or relevance of each entity referenced in the document may be determined to identify a document topic or combination of topics. A document may be annotated with an entity group or a set of co-occurring topics, for example, when the document is identified as including more than one entity or more than one topic.

In general, an entity group or a set of co-occurring topics may be considered as a "pseudo-entity" that may or may not exist as an entity in a commonly applied sense. For example, a news article about Marie Antoinette wearing a costume that includes chicken feathers may be annotated with the entity group Marie Antoinette+Costumes–in the present example, the article is about Marie Antoinette in a costume, and not about a Marie Antoinette Costume. As another example, a news article about Scarlet Pimpernel Movie premiere attendees wearing costumes to the premiere may be annotated with the entity group Scarlet Pimpernel+ Costumes, or may be annotated with the entity Scarlet Pimpernel Costumes, depending on the context of the article.

To generate possible entity groups or co-occurring topics, for example, entities of interest to a user may be grouped with other entities of interest in various combinations of two entities, three entities, four entities, etc. In general, a maximum group size (e.g., 2, 3, 4, etc.) can be selected, and all combinations of the maximum group size can be generated. For example, if a user is interested in the entities Costumes, Marie Antoinette, and the Scarlet Pimpernel, the entities may be grouped together to generate the entity groups Costumes+Marie Antoinette, Costumes+Scarlet Pimpernel, and Marie Antoinette+Scarlet Pimpernel. If more than two entities are to be grouped together to form an entity group, for example, the entities may be grouped to generate the entity group Costumes+Marie Antoinette+Scarlet Pimpernel.

One or more documents are selected, based at least in part on the interests of a user. For example, the index cluster 140 can select a set of documents 544 that may include documents of general interest, documents that have been accessed by users with similar profiles as the user, documents that have been accessed by users who are connected to the user on a social network, and/or documents that are related to topics of interest to the user. In the present example, the documents 544 include a news article about Shakespeare (e.g., Shakespeare's New Works), another about Marie Antoinette and Costumes (e.g., Marie Antoinette Dresses Like a Chicken), and another about the Scarlet Pimpernel, Marie Antoinette, and Movies (e.g., Marie Antoinette at the Scarlet Pimpernel Movie Premiere). The news article about Shakespeare, for example, may be a trending article of general interest, whereas the article about Marie Antoinette and Costumes and the article about the Scarlet Pimpernel/Marie Antoinette/Movies, for example, may be selected by the index cluster 140 based on the articles having at least one entity in common with the entities included in the set of user interests 152.

The documents in the set of selected documents 544 are scored and ranked, such that documents may be promoted that are associated with a set of co-occurring topics—or are associated with each of the entities in an entity group—that is determined to be uncommon and that includes multiple entities of interest to the user. For example, a document that has been annotated with each of the entities "Costumes" and "Marie Antoinette" may be promoted, whereas a document that has been annotated solely with the entity "Marie Antoinette" or that has been annotated with the entity "Marie Antoinette" and one or more entities that are not of interest to the user may not be promoted. In the present example, the scoring engine 150 can access a set of entity group inverse document frequency values 554 that correspond to the frequency of various entity groups in the corpus of documents 130. As users may generally be interested in documents that are about entities of interest that are rarely mentioned together, an entity group inverse document frequency value may be used as a measure of possible interestingness of an entity group to a user.

In some implementations, entity group frequency values may be calculated by using an inverse document frequency (IDF) algorithm. A low IDF value may indicate that the entities of the entity group are frequently mentioned together. Conversely, a high IDF value may indicate that the entities of the entity group are infrequently mentioned together. In the present example, the entity groups Marie Antoinette+Scarlet Pimpernel, Costumes+Scarlet Pimpernel, and Costumes+Marie Antoinette are associated with the entity group inverse document frequency values of 3.0, 2.4, and 2.3, respectively. Thus, in the present example, Marie Antoinette+Scarlet Pimpernel is a relatively uncommon co-occurring topic for a news article (and/or are infrequently mentioned together), whereas Costumes+Scarlet Pimpernel and Costumes+Marie Antoinette are both relatively common co-occurring topics (and/or are frequently mentioned together).

In some implementations, frequency scores may be calculated for all entity group combinations of entities associated with a corpus of documents. Considering the entities Shakespeare, Marie Antoinette, The Scarlet Pimpernel, and Costumes from the corpus of documents 130, for example, scores may be generated for each of the combinations Shakespeare+Marie Antoinette, Shakespeare+Costumes, Shakespeare+Scarlet Pimpernel, Marie Antoinette+Costumes, Marie Antoinette+Scarlet Pimpernel, and Scarlet Pimpernel+Costumes. Entity group combinations that do not occur in any documents in the corpus of documents 130, for example, may be associated with a highest possible score. Thus, when a document (e.g., a news article, blog post, social media updates, etc.), including such combinations does become available, for example, the document can be promoted to a user interested in each of the entities of the entity group.

Based at least in part on the entity group inverse document frequency values 554, the scoring engine 150 can assign or adjust a score for each of the selected documents 544 in the present example. A score for the selected news article about Shakespeare may be unadjusted, for example, as the document's topic is not present in the set of user interests 152. As another example, a score for the selected news article about Marie Antoinette and Costumes and a score for the selected news article about the Scarlet Pimpernel/Marie Antoinette/Movies, may each be positively adjusted, based on the inclusion of at least one set of co-occurring topics derived from the set of user interests 152. Moreover, the score associated with the selected news article about the Scarlet Pimpernel/Marie Antoinette/Movies may be positively adjusted to a greater degree than the score associated with the selected news article about Marie Antoinette and Costumes, for example, based at least in part on their respective entity group inverse document frequency values. The scoring engine 150 can use document scores as a factor in ranking the selected documents 544, for example. In the present example, according to their adjusted scores, the news article about the Scarlet Pimpernel/Marie Antoinette/Movies (e.g., Marie Antoinette at the Scarlet Pimpernel Movie Premiere) receives a high ranking, the news article about Marie Antoinette and Costumes (e.g., Marie Antoinette Dresses Like a Chicken) receives an intermediate ranking, and the news article about Shakespeare (e.g., Shakespeare's New Works) receives a low ranking.

Information associated with a set of ranked documents may be transmitted to the user. In the present example, a response 555 to the document request 505 is provided by the document system 120. The response 555, for example, can include information for rendering the website 565, and may include a set of links 570 (e.g., a link to the news article about Marie Antoinette at the Scarlet Pimpernel Movie Premiere), 572 (e.g., a link to the news article about Marie Antoinette Dressing Like a Chicken), and 574 (e.g., a link to the news article about Shakespeare's New Works). A page of the website 565, for example, can be presented to the user by the web browser 560 and the client device 110. Upon viewing the website's page, for example, the user may review the links 570, 572, and 574, and may select a link if interested in reading the corresponding news article.

In general, by promoting documents that include co-occurring topics of interest to a user that are rarely mentioned together in other documents, the user's experience may be improved. For example, some entities of interest may be relatively common in a corpus of documents, yet may rarely be mentioned together in a particular document. In the present example, both Marie Antoinette and the Scarlet Pimpernel are relatively common topics for news articles, yet rarely co-occur as topics of a particular article. Conversely, some entities of interest may be relatively rare in a corpus of documents, yet may be commonly mentioned in association with certain other entities. In the present example, the entity Costumes is relatively uncommon as the topic of a news article, but appears somewhat frequently in association with Marie Antoinette and with the Scarlet Pimpernel. By considering entity group frequency as a factor in ranking documents, for example, news articles with rare combinations of subject matter may surface which otherwise may have been buried in a stream of other articles. For example, a fan of Marie Antoinette, the Scarlet Pimpernel, and Costumes may be more interested in reading about Marie Antoinette at the Scarlet Pimpernel Movie Premiere (e.g., a rare and interesting occurrence) than reading about Marie Antoinette or the Scarlet Pimpernel appearing in a costume (both relatively common occurrences).

FIG. 6 shows an example system 600 that annotates documents with entities and calculates entity group frequencies. Components of the system 600 may be associated with the document system 120 (e.g., shown in FIG. 5), for example, and may be used to generate data which may subsequently be used by the document system 120, the index cluster 140 (e.g., also shown in FIG. 5), and the scoring engine 150 (e.g., also shown in FIG. 5) to handle document requests and responses. The system 600 includes an entity group annotator 620, the document database 230 (e.g., shown in FIG. 2), an entity group frequency calculator 640, and an entity group frequency archive 660.

As shown in FIG. 6, a set of documents 210 can be provided to the entity group annotator 620. For example, as each of the documents 210 is made available (e.g., as news articles are published, as blog posts are posted, as social media updates are entered, etc.), the entity group annotator 620 can analyze the document and annotate the document with one or more entity groups that are included in the document. As another example, documents may be analyzed and annotated by the entity group annotator 620 as a batch process. In some implementations, if a document is associated with multiple entities, the entities may be associated with an entity group and/or a set of co-occurring document topics. For example, if a document in the set of documents 210 is associated with the entities Marie Antoinette and the Scarlet Pimpernel, entity group annotator 620 can annotate the document with the entity group and/or set of co-occurring topics Marie Antoinette+Scarlet Pimpernel.

Annotated documents can be persisted and maintained by the document database 230 (e.g., similar to the corpus of documents 130, shown in FIG. 5). The entity group frequency calculator 640, for example, can access the document database 230 to determine the frequency of one or more entity groups identified by the entity group annotator 620 in the corpus of documents. In some implementations, the frequency of entity groups as co-occurring document topics may be calculated. For example, the entity group frequency calculator 640 can access the document database 230 to determine the frequency of each of the entity groups identified by the entity group annotator 620 as co-occurring document topics in the corpus of documents. In the present example, a set of entity group inverse document frequency values 654 (e.g., similar to the set of entity group inverse document frequency values 554, shown in FIG. 5) can be generated.

In some implementations, a corpus of documents may be filtered by a timeframe when calculating entity frequency. For example, the entity group frequency calculator 640 can access the document database 230 to identify documents that have been created (e.g., published, posted, updated, etc.) during a particular time period (e.g., the past hour, day, week, bi-week, month, etc.), and can calculate entity group frequency and/or co-occurring topic entity frequency over the time period. As the frequency of which entity groups are mentioned in or are the topic of news articles may change over time, a combination of subjects that may be infrequent during one period of time (e.g., Halloween+Costumes in April) may be commonplace during another period of time (e.g., Halloween+Costumes in October). By periodically recalculating entity group frequency, for example, the system 200 can ensure that entity group frequencies reflect a current corpus of documents.

The set of entity group inverse document frequency values 654 can be stored by the entity group frequency archive 660. For example, the archive 660 may maintain values associated with a currently relevant time period, and may maintain values associated with prior time periods. The entity group inverse document frequency values 654 can be provided to the scoring engine 150 to be used in scoring and ranking documents of interest to a user, for example.

Figure 7:
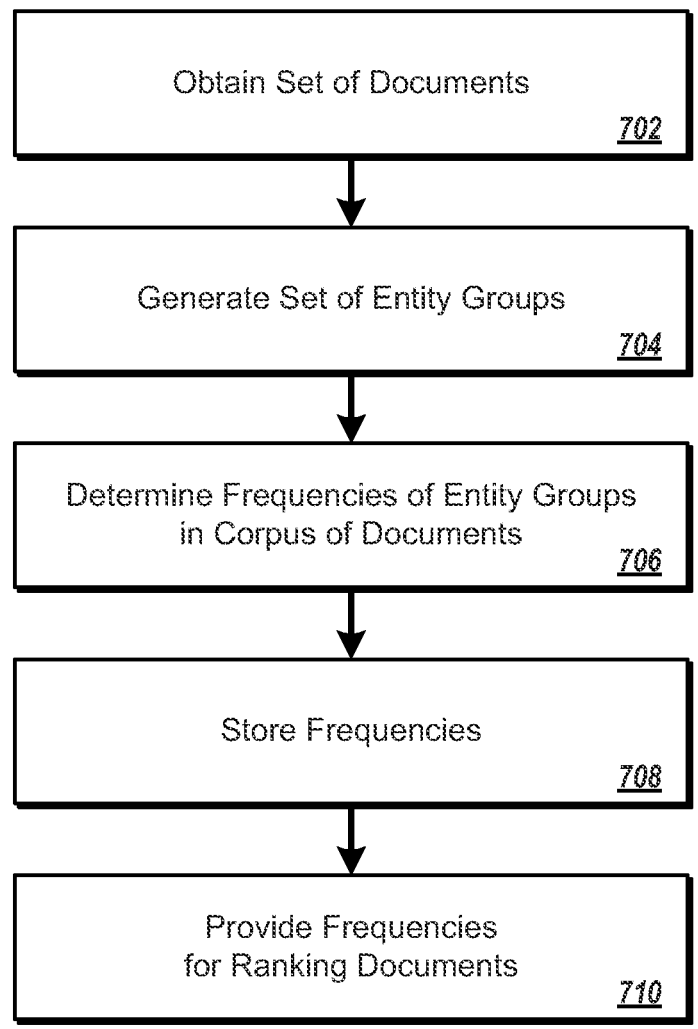
FIG. 7 is a flow chart of an example process for determining values corresponding to frequencies of entity groups in a corpus of documents.

FIG. 7 is a flow chart of an example process 700 for determining values corresponding to frequencies of entity groups in a corpus of documents. The process 300 will be described as being performed by an entity group frequency calculator, for example, the entity group frequency calculator 640 of FIG. 6. In general, a set of documents is obtained, a set of entity groups is generated, the frequencies of entity groups in a corpus of documents are determined, and frequency information is stored and provided for ranking documents.

In step 702, a set of documents is obtained from a corpus of documents. Referring to FIG. 6, for example, the entity group frequency calculator 640 can obtain a set of documents (e.g., news articles, blog posts, social media updates, etc.) from the document database 230. Each document in the set is associated with a plurality of entities. For example, each document in the set of documents obtained from the document database 230 may have been previously annotated by the entity annotator 220 and/or the entity group annotator 620 as documents are made available (e.g., as news articles are published, as blog posts are posted, as social media updates are entered, etc.). A document's association with an entity group may include a mention of the entities within the document, for example. As another example, a document's association with an entity group may include a designation of the entities as a set of co-occurring topics. In some implementations, documents may be annotated with one or more entities associated with a document's author(s) and/or publisher(s). For example, the author(s) or publisher(s) of a news article, blog post, social media update, etc., can be associated with entities which are then associated with the document.

In step 704, for each document in the set of documents, a set of entity groups can be generated from the associated plurality of entities. For example, the entity group annotator 620 can generate a set of entity groups from entities that have been identified in the set of documents 210. The set of entity groups may include combinations of entities selected from the plurality of entities. For example, a combination of entities that occurs in at least one of the documents in the set of documents 210 may be specified as an entity group. As another example, a combination of topic entities may be specified as a co-occurring topic.

In step 706, for each entity group from the set of entity groups, a value is determined that corresponds with a frequency of the entity group in the corpus of documents. For example, if a document in the set of documents obtained from the document database 230 includes words or phrases that are each associated with a different entity (e.g., a document includes the word "chocolate" and the phrase "Marie Antoinette"), the document may be associated with an entity group that includes each of the different entities. The entity group can be included in a set of defined entity groups (e.g., maintained by the document database 230). For each of the defined entity groups, for example, the entity group frequency calculator 640 can determine a total number of instances of the entity group within the corpus of documents stored by the document database 230 (e.g., the previously annotated documents).

In some implementations, the value may correspond to a frequency of each entity group in the corpus of documents as a co-occurring document topic. For example, if each of the entities in an entity group is designated as a topic of a particular document, the entity group annotator 620 may designate the entity group as a co-occurring document topic for that document. Each co-occurring document topic can be included in a set of co-occurring document topics (e.g., maintained by the document database 230). For each of the co-occurring document topics, for example, the entity group frequency calculator 640 can determine a total number of instances of the co-occurring topic within the corpus of documents stored by the document database 230 (e.g., the previously annotated documents) as a co-occurring document topic.

In some implementations, the value may correspond to a frequency of the entity group in the corpus of documents during a predetermined timeframe. For example, the entity group frequency calculator 640 can identify documents from the document database 230 that have been created (e.g., published, posted, updated, etc.) during a particular time period (e.g., the past hour, day, week, bi-week, month, etc.), and can calculate entity group frequency and/or co-occurring topic frequency over the time period. In general, a set of entity groups or co-occurring topics, and the frequencies of the entity groups or co-occurring topics may change from one time period to another. By periodically filtering the corpus of documents stored by the document database 230 by timeframe, for example, data associated with entity groups and entity group frequencies may reflect current circumstances.

In some implementations, the value corresponding to the frequency of each entity group in the corpus of documents may include an inverse document frequency (IDF) of the entity group in the corpus of documents. A low IDF value may indicate that instances of an entity group are frequently included in a corpus of documents, or that the entity group is a frequent co-occurring document topic. Conversely, a high IDF value may indicate that instances of an entity group are infrequently included in a corpus of documents, or that the entity group is an infrequent co-occurring document topic. In general, an IDF value of an entity group or co-occurring topic may be calculated by the entity group frequency calculator 640 through the use of an algorithm that divides the total number of documents in a corpus of documents by the number of documents including an instance of the entity group or co-occurring topic. In some implementations, the logarithm of the resulting quotient may be taken, to smooth the results and to generate a suitable basis of comparison between entity groups or co-occurring topics. For example, if a corpus of documents includes one thousand documents, and one document includes an instance of the entity Marie Antoinette and an instance of the entity the Scarlet Pimpernel (or include the entities Marie Antoinette and the Scarlet Pimpernel as co-occurring topics), the logarithm can be taken of the resulting quotient of one thousand divided by one, for an entity IDF value of three. In some implementations, before taking the logarithm, a value of one may be added to the divisor of the quotient. For example, if the frequency of an entity is zero, then the divisor will be zero and the quotient will be undefined—thus, a value of one can be added to the divisor to prevent such an occurrence.

In step 708, each value corresponding to the frequency of each entity group in the corpus of documents is stored. For example, the set of entity group inverse document frequency values 654 determined by the entity group frequency calculator 640 can be stored by the archive 660. In the present example, the entity group Costumes+Marie Antoinette is associated with an IDF value of 3.0, the entity group Costumes+Scarlet Pimpernel is associated with an IDF value of 2.4, and the entity group Costumes+Marie Antoinette is associated with an IDF value of 2.3.

In step 710, at least one of the stored values is provided for ranking documents of interest to a user in response to a request for documents. Referring to FIG. 5, for example, upon receiving the document request 505 (e.g., a request for news articles), the document system 120 can use the index cluster 140 to retrieve one or more documents that may include entity group instances or have co-occurring topics that correspond with entity combinations that may be generated from the set of user interests 152. In the present example, the set of selected documents 544 includes a news article about Marie Antoinette and Costumes (e.g., Marie Antoinette Dresses Like a Chicken), and a news article about the Scarlet Pimpernel, Marie Antoinette, and Movies (e.g., Marie Antoinette at the Scarlet Pimpernel Movie Premiere). The scoring engine 150, for example, can access the set of entity group inverse document frequency values 554 (e.g., similar to the set of entity group inverse document frequency values 654) and can identify the entity inverse document frequency value associated with Marie Antoinette+Scarlet Pimpernel (e.g., 3.0) when scoring and/or ranking the news article about the Scarlet Pimpernel, Marie Antoinette, and Movies, and can identify the entity inverse document frequency value associated with Costumes+Marie Antoinette (e.g., 2.3) when scoring and/or ranking the news article about Marie Antoinette and Costumes.

Figure 8:
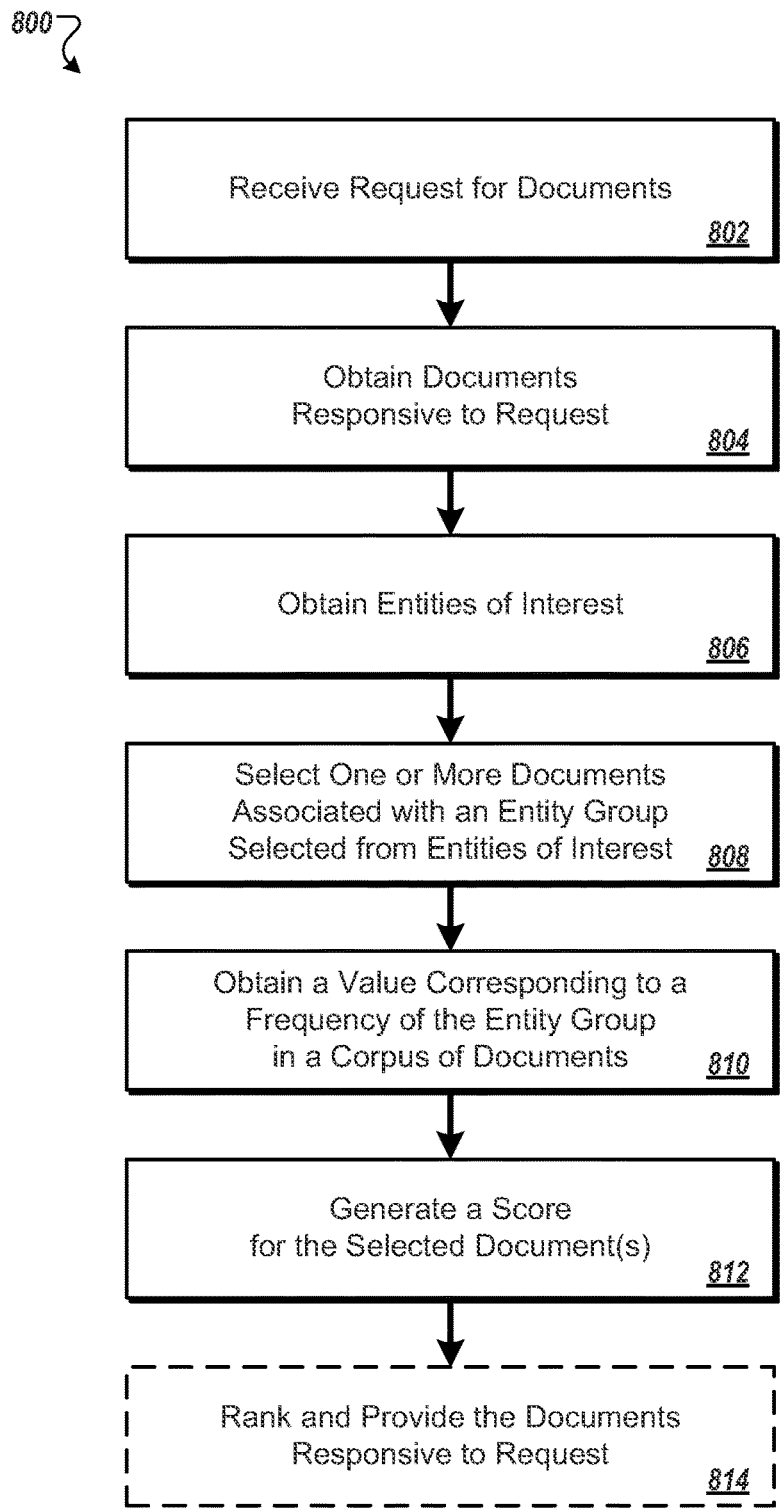
FIG. 8 is a flow chart of an example process for ranking documents based on entity group frequency.

FIG. 8 is a flow chart of an example process 800 for ranking documents based on entity group frequency. The process 800 will be described as being performed by a document system, index cluster, and scoring engine, for example, the document system 120, the index cluster 140, and the scoring engine 150 of FIG. 5. In some implementations, more or fewer system components may be used to perform the example process 800. For example, the process 800 may be performed by distributed or centralized systems. In general, a request for documents is received, documents responsive to the request are obtained, entities of interest to a user are obtained, and one or more documents associated with an entity group are selected, the entity group being represented in the entities of interest. For at least one selected document, a value is obtained corresponding to a frequency of the entity group in a corpus of documents, and a score is generated for the document. Based at least in part on the generated score, the documents may be ranked and provided to a user.

In step 802, a request for documents is received. Referring to FIG. 5, for example, the document system 120 can receive the request 505 for documents, e.g., news articles, blog posts, social media updates, etc., from the client device 110. The request for documents can be associated with a user. For example, the request 505 may include or may be associated with information (e.g., user identification information, login information, etc.) that is associated with a user of the client device 110. In the present example, the user of the client device 110 can use the web browser 560 to access the website 565 (e.g., www.news.com/example) which provides various news articles to the user.

In step 804, a set of documents responsive to the request for documents is obtained. For example, the document system 120 can use the index cluster 140 to access the corpus of documents 130, which may include documents such as news articles, blog posts, social media updates, etc. In the present example, the set of documents can include recent news articles published by and/or aggregated by the news website 565. As another example, documents can be retrieved that have been annotated with one or more topics and that include one or more topics of interest to a user.

In step 806, data corresponding to a set of entities of interest to the user is obtained. For example, the document system 120 and/or the index cluster 140 can obtain the set of user interests 152 associated with the user of the client device 110. In the present example, the user's interests include Chocolate, Costumes, Marie Antoinette, and the Scarlet Pimpernel, possibly among other interests. In some implementations, the data corresponding to the set of entities of interest to the user may include a set of entity identifiers of entities of interest to the user. For example, each of the entities of interest included in the set of user interests 152 may be associated with an entity identifier that uniquely identifies the entity as a particular noun class. The entity "Chocolate", for example, may be associated with an entity identifier that disambiguates the entity from other entities with a similar name—that is, as a foodstuff, and not as a song by a rock band, nor as a martial arts film.

In step 808, at least one document associated with an entity group is selected, the entity group being represented in the set of entities of interest to the user. For example, the index cluster 140 can refer to the set of user interests 152 and can generate one or more entity groups, or can refer to a set of pre-generated entity groups that include a combination of two or more entities of interest to the user, when selecting the set of selected documents 544. In the present example, the selected documents 544 include a general news article (e.g., an article discussing Shakespeare's New Works), another article that includes an entity group that corresponds with multiple entities of interest to the user (e.g., an article about Marie Antoinette wearing a costume that includes chicken feathers), and another article that includes an entity group that corresponds with multiple entities of interest to the user and an additional entity (e.g., an article about Marie Antoinette at the Scarlet Pimpernel Movie premiere).

In some implementations, document(s) may be selected based on having a co-occurring topic that includes a plurality of entities that are in the set of entities of interest to the user. For example, the entity group annotator 620 (shown in FIG. 6) may have previously designated multiple entities as co-occurring topics of a document, based on weight scores of the entities in association with the document. In the present example, Marie Antoinette and Costumes may have been designated as co-occurring topics of the news article about Marie Antoinette wearing a costume that includes chicken feathers, and the article may be selected based at least in part on Marie Antoinette and Costumes both being entities of interest to the user.

In step 810, for the selected document(s), a value is obtained that corresponds to a frequency of the entity group in a corpus of documents. For each of the entity groups that include two or more entities of interest and that are associated with one or more of the selected documents 544, for example, the scoring engine 150 can obtain a value corresponding to a frequency of the entity group within the corpus of documents 130, from the set of entity group inverse document frequency values 554. In some implementations, the set of entity group inverse document frequency values may include values corresponding to a frequency of an entity group in the corpus of documents during a predetermined timeframe (e.g., the past hour, day, week, bi-week, month, etc.). For example, the entity group frequency calculator 640 (shown in FIG. 6) can periodically calculate entity group and/or co-occurring topic entity frequencies for documents that were created (e.g., published, posted, updated, etc.) during the timeframe. In some implementations, the value may correspond with a frequency of the associated entity group in the corpus of documents as a co-occurring document topic. For example, the entity Marie Antoinette and the entity the Scarlet Pimpernel may be co-occurring topics for one or more documents in the corpus of documents 130.

In some implementations, the value corresponding to the frequency of the entity group in the corpus of documents may include an inverse document frequency (IDF) of the entity group in the corpus of documents. For example, the entity group Marie Antoinette+Scarlet Pimpernel may be associated with an IDF value of 3.0, and the entity group Costumes+Marie Antoinette may be associated with an IDF value of 2.3. Thus, in the present example, the entity Marie Antoinette may occur less frequently in association with the entity the Scarlet Pimpernel than in association with the entity Costumes, within the corpus of documents 130 for a recent timeframe. For users who are interested in Marie Antoinette, the Scarlet Pimpernel, and Costumes, for example, documents about Marie Antoinette and the Scarlet Pimpernel may be more interesting than documents about Marie Antoinette and Costumes.

In step 812, a score is generated for the selected document(s). For example, the scoring engine 150 can generate a score for each of the documents in the set of selected documents 544. The score is based at least in part on the value corresponding to the frequency of the entity group in the corpus of documents. In the present example, a score for the selected news article about Shakespeare may be unadjusted, as the document's topic is not present in the set of user interests 152, whereas a score for the selected news article about Marie Antoinette and Costumes, and a score for the selected news article about the Scarlet Pimpernel, Marie Antoinette, and Movies, may each be positively adjusted, based on the inclusion of at least one co-occurring topic that may include two or more entities from the set of interests 152.

In some implementations, generating a score for the document(s) may include generating an initial score for the document(s), and, based on determining that the value corresponding to the frequency of the entity group satisfies a threshold, incrementing the score for the at least one document. Incrementing a score, for example, may include adding an amount to the score, and/or multiplying the score by a value. For example, the scoring engine 150 can generate initial scores for each of the selected documents 544. Initial scores, for example, may be based on one or more factors, such as relevance scores (e.g., based on a submitted search query, a request for a particular type of information, etc.), quality scores (e.g., based on user ratings, click rates, etc.), and other suitable factors. A predetermined threshold may be specified as an indication of entity group rarity, and thus possible interestingness to a user. In the present example, a threshold entity group inverse document frequency value of 3.0 can be specified as a threshold value—document scores for documents associated with entity groups (including two or more entities of interest) having a value that satisfies the threshold (e.g., having a value greater than or equal to the threshold value), for example, may be incremented. Thus, in the present example, a document score for the news article about the Scarlet Pimpernel, Marie Antoinette, and Movies (e.g., including the entity group Marie Antoinette+Scarlet Pimpernel, which is associated with an entity group inverse document frequency value of 3.0) may be incremented, whereas a document score for the news article about Marie Antoinette and Costumes (e.g., an entity group associated with an entity group inverse document frequency value of 2.3) may be unadjusted.

In some implementations, generating a score for the document(s) may include adding an amount to the document's score. The amount can be a function of the value corresponding to the frequency of the associated entity group. For example, a continuous or step function can be used to adjust document scores, such that scores for documents that include entity groups or co-occurring topic entities that are determined to be less frequent relative to other entity groups or co-occurring topic entities in a corpus of documents can be incremented to a greater degree than scores for documents that include entity groups or co-occurring topic entities that are determined to be more frequent. In the present example, an incremental adjustment score applied to the initial score for the news article about the Scarlet Pimpernel, Marie Antoinette, and Movies (e.g., including an entity group associated with an entity group inverse document frequency value of 3.0) may be proportionally greater than an incremental adjustment score applied to the initial score for the news article about Marie Antoinette and Costumes (e.g., an entity group associated with an entity group inverse document frequency value of 2.3).

In step 814, the set of documents that are responsive to the request for one or more documents may be optionally ranked and provided to the user. Each of the selected document(s) may be ranked, based at least in part on its respective generated score. For example, the generated scores for each of the selected documents 544 (e.g., the news article about Shakespeare, the news article about Marie Antoinette and Costumes, and the news article about the Scarlet Pimpernel, Marie Antoinette, and Movies) can be compared by the scoring engine 150 to determine a document ranking. In the present example, based on their respective scores, the news articles about the Scarlet Pimpernel/Marie Antoinette/Movies, Marie Antoinette/Costumes, and Shakespeare may be ranked first, second, and third, respectively. Information associated with one or more of the ranked documents may be transmitted to the user. In the present example, information about each of the ranked documents can be provided by the document system 120 to the client device 110 in the form of the response 555, which can include information for rendering the news website 565. The information for rendering the website 565, for example, can include a set of links 570 (e.g., a link to the news article about Marie Antoinette at the Scarlet Pimpernel Movie Premiere), 572 (e.g., a link to the news article about Marie Antoinette Dressing Like a Chicken), and 574 (e.g., a link to the news article about Shakespeare's New Works), and can be presented by the website to the user according to the ranked order of the corresponding documents. Thus, in the present example, a document associated with an infrequently documented combination of entities of interest (e.g., Marie Antoinette and the Scarlet Pimpernel) may be presented to the user in a more prominent position (e.g., above) than a document associated with a common or frequently documented combination of entities of interest (e.g., Marie Antoinette and Costumes).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving, from a client device and by a document system, a request for one or more documents;
obtaining, by the document system and from a corpus of documents, a set of documents responsive to the request;
obtaining, from a user profile associated with a source of the request, representations of one or more topics of interest to a user;
selecting, by the document system and using an index, at least one document from the set of documents that is associated with a particular topic that matches at least one of the one or more topics of interest to the user;
for the at least one selected document, obtaining a value corresponding to an inverse document frequency of the particular topic in the corpus of documents, comprising:
identifying a first number of documents in the corpus of documents that have been created during a limited time period that ranges from a prior time to a current time, wherein the first number of documents is less than a total number of documents in the corpus of documents; and
identifying a second number of documents in the corpus of documents that have been created during the limited time period and that reference the particular topic, wherein the second number of documents is less than the first number of documents, wherein the value corresponding to the inverse document frequency is based on a ratio of the first number of documents and the second number of documents;
generating a score for the at least one document based at least in part on the value corresponding to the inverse document frequency that is based on the ratio of the first number of documents and the second number of documents;
determining that the score for the at least one document satisfies a threshold score that indicates that the particular topic of the at least one document is an infrequent topic in the corpus of documents; and
responsive to determining that the score for the at least one document satisfies the threshold score that indicates that the particular topic of the at least one document is an infrequent topic in the corpus of documents, transmitting information associated with the at least one document from the document system to the client device in response to the request, wherein the transmitted information includes information for rendering an interface that provides access to the at least one document.

2. The method of claim 1, further comprising ranking the set of documents that are responsive to the request for one or more documents, wherein the at least one document is ranked based at least in part on the respective generated score.

3. The method of claim 2, further comprising transmitting information associated with one or more of the ranked documents to the user.

4. The method of claim 1, wherein the representations of the one or more topics of interest to the user comprise a set of entity identifiers of entities, each entity corresponding to one of the one or more topics of interest, and each entity being represented by a node in a graph, the nodes for the one or more topics of interest corresponding to nodes associated with the at least one selected document.

5. The method of claim 1, wherein the score for the at least one document is generated based on a function of the value corresponding to the inverse document frequency.

6. The method of claim 1, further comprising associating each document in the corpus of documents with a topic, comprising:
for each entity referenced in the document, determining a weight score for the entity that is proportional to a percentage of content in the document related to the entity; and
designating the entity that has the highest weight score as the topic of the document.

7. A computer-implemented method comprising:
receiving, from a client device and by a document system, a request for one or more documents;
obtaining, by the document system and from a corpus of documents, a set of documents responsive to the request;
obtaining, from a user profile associated with a source of the request, representations of a plurality of topics of interest to a user;
selecting, by the document system and using an index, at least one document from the set of documents that is associated with a particular group of co-occurring topics that matches at least one group of topics in the plurality of topics of interest to the user;
for the at least one selected document, obtaining a value corresponding to an inverse document frequency of the particular group of co-occurring topics in the corpus of documents, comprising:
identifying a first number of documents in the corpus of documents that have been created during a limited time period that ranges from a prior time to a current time, wherein the first number of documents is less than a total number of documents in the corpus of documents; and
identifying a second number of documents in the corpus of documents that have been created during the limited time period and that reference the particular group of co-occurring topics, wherein the second number of documents is less than the first number of documents, wherein the value corresponding to the inverse document frequency is based on a ratio of the first number of documents and the second number of documents;
generating a score for the at least one document based at least in part on the value corresponding to the inverse document frequency that is based on the ratio of the first number of documents and the second number of documents;
determining that the score for the at least one document satisfies a threshold score that indicates that the particular group of co-occurring topics of the at least one document is an infrequent group of co-occurring topics in the corpus of documents; and
responsive to determining that the score for the at least one document satisfies the threshold score that indicates that the particular group of co-occurring topics of the at least one document is an infrequent group of co-occurring topics in the corpus of documents, transmitting information associated with the at least one document from the document system to the client device in response to the request, wherein the transmitted information includes information for rendering an interface that provides access to the at least one document.

8. The method of claim 7, further comprising ranking the set of documents that are responsive to the request for one or more documents, wherein the at least one document is ranked based at least in part on the respective generated score.

9. The method of claim 8, further comprising transmitting one or more of the ranked documents to the user.

10. The method of claim 7, wherein the representations of the plurality of topics of interest to the user comprise a set of entity identifiers of entities, each entity corresponding to one of the one or more topics of interest, and each entity being represented by a node in a graph, the nodes for the one or more topics of interest corresponding to nodes associated with the at least one selected document.

11. The method of claim 7, wherein the score for the at least one document is generated based on a function of the value corresponding to the inverse document frequency.

12. A system comprising:
one or more computers and one or more storage devices storing instructions that are operable, when executed by the one or more computers, to cause the one or more computers to perform operations comprising:
receiving, from a client device and by a document system, a request for one or more documents;
obtaining, by the document system and from a corpus of documents, a set of documents responsive to the request;
obtaining, from a user profile associated with a source of the request, representations of one or more topics of interest to a user;
selecting, by the document system and using an index, at least one document from the set of documents that is associated with a particular topic that matches at least one of the one or more topics of interest to the user;
for the at least one selected document, obtaining a value corresponding to an inverse document frequency of the particular topic in the corpus of documents, comprising:
identifying a first number of documents in the corpus of documents that have been created during a limited time period that ranges from a prior time to a current time, wherein the first number of documents is less than a total number of documents in the corpus of documents; and
identifying a second number of documents in the corpus of documents that have been created during the limited time period and that reference the particular topic, wherein the second number of documents is less than the first number of documents, wherein the value corresponding to the inverse document frequency is based on a ratio of the first number of documents and the second number of documents;

generating a score for the at least one document based at least in part on the value corresponding to the inverse document frequency that is based on the ratio of the first number of documents and the second number of documents;

determining that the score for the at least one document satisfies a threshold score that indicates that the particular topic of the at least one document is an infrequent topic in the corpus of documents; and responsive to determining that the score for the at least one document satisfies the threshold score that indicates that the particular topic of the at least one document is an infrequent topic in the corpus of documents, transmitting information associated with the at least one document from the document system to the client device in response to the request, wherein the transmitted information includes information for rendering an interface that provides access to the at least one document.

13. The system of claim 12, further comprising ranking the set of documents that are responsive to the request for one or more documents, wherein the at least one document is ranked based at least in part on the respective generated score.

14. The system of claim 13, further comprising transmitting information associated with one or more of the ranked documents to the user.

15. The system of claim 12, wherein the representations of the one or more topics of interest to the user comprise a set of entity identifiers of entities, each entity corresponding to one of the one or more topics of interest, and each entity being represented by a node in a graph, the nodes for the one or more topics of interest corresponding to nodes associated with the at least one selected document.

16. The system of claim 12, wherein the score for the at least one document is generated based on a function of the value corresponding to the inverse document frequency.

* * * * *